No. 795,193.                                          Patented July 18, 1905.

UNITED STATES PATENT OFFICE.

HARRY HUSE CAMPBELL, OF STEELTON, PENNSYLVANIA.

TREATMENT OF CHROMIFEROUS IRON.

SPECIFICATION forming part of Letters Patent No. 795,193, dated July 18, 1905.

Application filed December 22, 1904. Serial No. 237,989.

*To all whom it may concern:*

Be it known that I, HARRY HUSE CAMPBELL, a citizen of the United States, residing at Steelton, in the county of Dauphin and State of Pennsylvania, have invented certain new and useful Improvements in the Treatment of Chromiferous Iron; and I do hereby declare the following to be a full, clear, and exact description of the invention, such as will enable others skilled in the art to which it appertains to make and use the same.

This invention relates to the treatment of chromiferous iron for the extraction and removal therefrom of chromium, whereby a marketable product is obtained and one that is capable by further treatment of being converted into steel of such quality capable of use in the construction of railways, bridges, ships, and other structures, as will be hereinafter described and claimed.

It is well known to iron-masters that if steel has a content of chromium in excess of a small proportion it is unfit for use for most of the purposes to which steel is applied in engineering works and also that it has not been practicable to make use of iron rich in chromium as a starting metal for the manufacture of steel on a profitable basis, especially on such a large scale as is requisite for the production of the steels for railways, bridges, and other structures because of the inability of those heretofore skilled in the art to effect the economical removal or elimination of the chromium or the greater part of it from irons containing that element. This I have successfully accomplished, and in carrying out my process the chromiferous iron to be treated is preferably taken from the blast-furnace where it has been produced by smelting chromiferous-iron ores in the melted state, or pigs of such iron may be melted in a suitable furnace and charged in the melted state into a suitable furnace, after having first determined the quantity of iron required for a charge. By "furnace" I mean such devices in which iron is treated by means of heat and of which converters open-hearth and like furnaces are types; but I will describe my process as carried out in converters. The molten chromiferous iron is charged into a converter lined with basic material and known as a "basic Bessemer converter." It is desirable that loose basic material, such as lime, be added with the metal or during the process and the charge then be subjected to the pneumatic or Bessemer process as usually employed for the removal of silicon and carbon from iron, said silicon and carbon being oxidized by the oxygen contained in the air-blast that is driven through the charge. I prolong this blowing process beyond the usual period required for the elimination of silicon and carbon, whereupon the chromium contained in the iron is finally acted upon by being oxidized and eliminated from the iron, becoming part of the slag, and in order to prevent the return of the chromium from the slag to the metal it is necessary to separate the metal and slag before recarburization, meaning by "recarburization" any process for removing oxygen from the blown metal or incorporating with it manganese, carbon, or other elements usually deemed necessary in steel after decarburization of the iron. Having removed the chromium from the metallic part of the charge in the manner above described, the charge is drawn from the aforesaid converter, preferably into a ladle suitably mounted on a traveling crane, said ladle or other receptacle being provided with means for rapidly drawing off the metal from beneath the slag and for stopping or controlling the flow of slag. The metallic part of the charge is then drawn from the ladle or receptacle, and thus separated from the slag for further treatment. This further treatment may be according to the final use for which the steel is intended and the extent to which the blowing or overblowing has caused the dechromized metal to contain oxygen, the elimination of which is necessary in the successful production of steel. In some cases, such as where the final use requires steel of low carbon and the dechromized metal does not contain oxygen to such extent as to prohibit this method, after separating the dechromized metal from the slag and having same in a second ladle or other receptacle I incorporate the dechromized metal with ferromanganese to obtain the usual reaction and elimination of oxygen by manganese. In other cases, such as when the dechromized metal contains considerable oxygen, I charge the same into a second converter, wherein I combine the charge with an addition of molten unblown iron, carrying the usual proportion of carbon and practically free from chromium, preferably the usual low phosphorous quality of iron commonly used in the Bessemer process, whereby a reaction between oxygen in the charge and carbon in the iron addition is effected, following which the charge is subjected to a second blowing, the remaining carbon and silicon of the iron addition being oxidized by the oxygen of the air-blast, as in the usual Bessemer process, thus reheating the metal of the charge first acted upon, which had been somewhat cooled during the transfer, bringing it to a suitable temperature for the reception of ferromanganese or other recarburizing material requisite for imparting the desirable content of carbon and for final elimination of iron oxid from the resulting steel. The second converter will preferably be lined with a silicious or acid lining, as in the usual acid Bessemer process, since this would usually be cheaper than a basic lining. With such an acid lining it may be desirable to add a small amount of sand in the second converter to assist in the formation of a proper slag.

The raw iron that I have so far treated has had a content of chromium varying from one to five per cent. In one charge the iron contained two and one-half per cent. chromium. After removal from the basic converter the chromium content had been reduced to one-tenth per cent. This same dechromized product was then transferred to an acid-lined converter and twenty-five per cent. of melted iron free from chromium was added. The mixture was then blown and recarburized. The finished steel contained only 0.08 per cent. chromium.

Having thus described my invention, what I claim as new therein, and desire to secure by Letters Patent, is—

1. The method of treating chromiferous iron, which consists in charging the same into a basic Bessemer converter, producing a basic slag, oxidizing the chromium by blowing air through the body of the metal, thereby causing the chromium to become part of the slag, and separating metal and slag, substantially as described.

2. The method of treating chromiferous iron, which consists in charging the same into a basic Bessemer converter, adding loose basic material, oxidizing the chromium by blowing air through the charge, thereby causing it to become part of the slag, separating metal and slag, and subjecting the metal to the desired subsequent treatment, substantially as described.

3. The method of treating chromiferous iron, which consists in charging the same in a molten state into a basic Bessemer converter, adding loose basic material, blowing the charge and prolonging the blow beyond the usual period to oxidize chromium and cause it to become part of the slag, separating metal and slag, and subjecting the metal to the desired subsequent treatment, substantially as described.

4. The method of treating chromiferous iron, which consists in charging the same into a basic-lined furnace, producing a basic slag, oxidizing chromium and causing it to form part of the slag, separating metal and slag, charging the resulting decarburized metal into a suitable furnace with iron substantially free from chromium and having a higher carbon content, and finishing the metal.

5. The method of treating chromiferous iron, which consists in charging the same in a molten state into a basic-lined Bessemer converter, producing a basic slag, oxidizing chromium by prolonging the blow beyond the usual period to cause the chromium to enter the slag, separating metal and slag, charging the dechromized metal into a second acid-lined converter with iron free from chromium, and having a higher carbon content than the dechromized iron, and finishing the metal, substantially as described.

6. The method of treating chromiferous iron, which consists in charging the same in a molten state into a basic-lined Bessemer converter with loose basic material, blowing the charge to oxidize chromium and cause it to enter the slag, separating metal and slag, charging the metal into an acid-lined Bessemer converter with silicious material, and iron free from chromium and having a higher carbon content, and finally recarburizing the metal to the desired extent, substantially as described.

7. The method of treating chromiferous iron, which consists in charging the same into a basic Bessemer converter, producing a basic slag, and oxidizing the chromium by blowing air through the body of the metal, thereby causing chromium to become part of the slag, substantially as described.

8. The method of treating chromiferous iron, which consists in charging the same in a molten state into a basic-lined furnace, producing a basic slag, oxidizing chromium and causing it to form part of the slag, separating metal and slag after the oxidation has been sufficiently prolonged, charging the resulting metal into a suitable furnace with iron substantially free from chromium and having a higher carbon content to reduce metallic oxids in the dechromized metal and furnish additional heat by the combustion of the carbon in the iron addition, thereby saving more expensive deoxidizing materials.

In testimony that I claim the foregoing as my invention I have signed my name in presence of two subscribing witnesses.

HARRY HUSE CAMPBELL.

Witnesses:
J. B. F. LAURIE,
HOMER L. LITZENBERG.